(12) United States Patent
La Forest et al.

(10) Patent No.: US 8,597,772 B2
(45) Date of Patent: Dec. 3, 2013

(54) CORRUGATED CARBON FIBER PREFORM

(75) Inventors: Mark L. La Forest, Granger, IN (US); Slawomir Fryska, Granger, IN (US)

(73) Assignee: Honeywell International Inc., Morristown, NJ (US)

(*) Notice: Subject to any disclaimer, the term of this patent is extended or adjusted under 35 U.S.C. 154(b) by 0 days.

(21) Appl. No.: 13/237,266

(22) Filed: Sep. 20, 2011

(65) Prior Publication Data

US 2013/0071628 A1    Mar. 21, 2013

(51) Int. Cl.
| B32B 3/28 | (2006.01) |
| B32B 3/30 | (2006.01) |
| B32B 17/12 | (2006.01) |
| B32B 18/00 | (2006.01) |
| B32B 9/00 | (2006.01) |

(52) U.S. Cl.
USPC ........ 428/184; 428/293.4; 428/408; 428/161; 264/257; 264/258

(58) Field of Classification Search
USPC ................. 428/167, 181, 182, 184, 161, 408, 428/293.4; 156/60, 242; 264/257, 258
See application file for complete search history.

(56) References Cited

U.S. PATENT DOCUMENTS

| 5,242,746 A | 9/1993 | Bommier et al. |
| 5,578,255 A | 11/1996 | Okuyama et al. |
| 5,800,647 A | 9/1998 | Andersen et al. |
| 6,083,436 A * | 7/2000 | Thompson et al. ............. 264/81 |
| 6,979,377 B2 | 12/2005 | Bunis et al. |
| 7,090,057 B2 * | 8/2006 | Fryska et al. ................. 188/71.5 |
| 2008/0143005 A1 | 6/2008 | Lim et al. |

FOREIGN PATENT DOCUMENTS

| EP | 1 908 740 A1 | 4/2008 |
| JP | 6157139 | 6/1994 |
| WO | 9632618 A1 | 10/1996 |
| WO | 97/30321 A1 | 8/1997 |

OTHER PUBLICATIONS

Byrne et al., "influence of Thermal Properties on Friction Performance of Carbon Composites," Carbon 39, 2001, pp. 1789-1801.
Gong et al., "Tribological Properties of Carbon Nanotube-Doped Carbon/Carbon Composites," Tribology International, 39, 2006, pp. 937-944.
Examination Report from counterpart EP Application No. 12 184 315.5, dated Mar. 27, 2013, 4 pages.
European Search Report from counterpart EP Application No. 12 184 315.5, dated Jan. 30, 2013, 3 pages.
Response to Examination Report dated Mar. 27, 2013, from counterpart European application No. 12184315.5, filed Jul. 24, 2013, 16 pp.

* cited by examiner

*Primary Examiner* — Catherine A Simone
(74) *Attorney, Agent, or Firm* — Shumaker & Sieffert, P.A.

(57) ABSTRACT

In one example, a method includes mixing a plurality of carbon fibers in a liquid carrier to form a mixture, depositing the carbon fiber mixture in a layer, forming a plurality of corrugations in the carbon fiber layer, and rigidifying the corrugated carbon fiber layer to form a corrugated carbon fiber preform. In another example, a method includes substantially aligning a first ridge on a first surface of a first corrugated carbon fiber preform and a first groove on a first surface of a second corrugated carbon fiber preform, bringing the first surface of the first corrugated carbon fiber preform into contact with the first surface of the second corrugated carbon fiber preform, and densifying the first corrugated carbon fiber preform and the second carbon fiber preform to bond the first corrugated carbon fiber preform and the second carbon fiber preform.

18 Claims, 6 Drawing Sheets

CORRUGATED CARBON FIBER PREFORM

TECHNICAL FIELD

The disclosure relates to preforms for carbon-carbon composite brake discs and techniques for forming carbon-carbon composite preforms.

BACKGROUND

Carbon-carbon composite brake discs are used in many high performance braking applications, such as brake systems for aircraft. In some examples, carbon-carbon composite brake discs may be formed by first forming a brake disc preform from a carbon fiber precursor material, such as polyacrylonitrile (PAN). The brake disc preform can be formed by needling sheets of nonwoven PAN fibers together. The brake disc preform may then be carbonized to form a carbon fiber preform by heating the brake disc preform at a relatively high temperature.

SUMMARY

In general, the disclosure is directed to a corrugated carbon fiber preform and methods for forming the corrugated carbon fiber preform. In addition, the disclosure is directed to a carbon-carbon composite material formed from at least two corrugated carbon fiber preforms and methods for forming the carbon-carbon composite material from at least two corrugated carbon fiber preforms.

In one example, the disclosure is directed to a method that includes mixing a plurality of carbon fibers in a liquid carrier to form a carbon fiber mixture, depositing carbon fiber mixture in a carbon fiber layer, forming a plurality of corrugations in the carbon fiber layer to form a corrugated carbon fiber layer, and rigidifying the corrugated carbon fiber layer to form a corrugated carbon fiber preform.

In another example, the disclosure is directed to a method that includes substantially aligning a first ridge on a first surface of a first corrugated carbon fiber preform and a first groove on a first surface of a second corrugated carbon fiber preform. In accordance with this example, the method also includes bringing the first surface of the first corrugated carbon fiber preform into contact with the first surface of the second corrugated carbon fiber preform while the first ridge on the first surface of the first corrugated carbon fiber preform is substantially aligned with the first groove on the first surface of the second corrugated carbon fiber preform. The method may also include, after bringing the first surface of the first corrugated carbon fiber preform into contact with the first surface of the second corrugated carbon fiber preform, densifying the first corrugated carbon fiber preform and the second carbon fiber preform to bond the first corrugated carbon fiber preform and the second carbon fiber preform.

In an additional example, the disclosure is directed to a carbon-carbon composite material that includes a first corrugated carbon fiber preform, where the first corrugated carbon fiber preform defines a first surface including a first ridge. In accordance with this example, the carbon-carbon composite material also includes a second corrugated carbon fiber preform, where the second corrugated carbon fiber preform defines a first surface including a first groove. According to this example, the first ridge is substantially aligned with the first groove, and the first surface of the first corrugated carbon fiber preform is in contact with the first surface of the second corrugated carbon fiber preform.

The details of one or more examples are set forth in the accompanying drawings and the description below. Other features, objects, and advantages of the disclosure will be apparent from the description and drawings, and from the claims.

DETAILED DESCRIPTION

Figure 1:
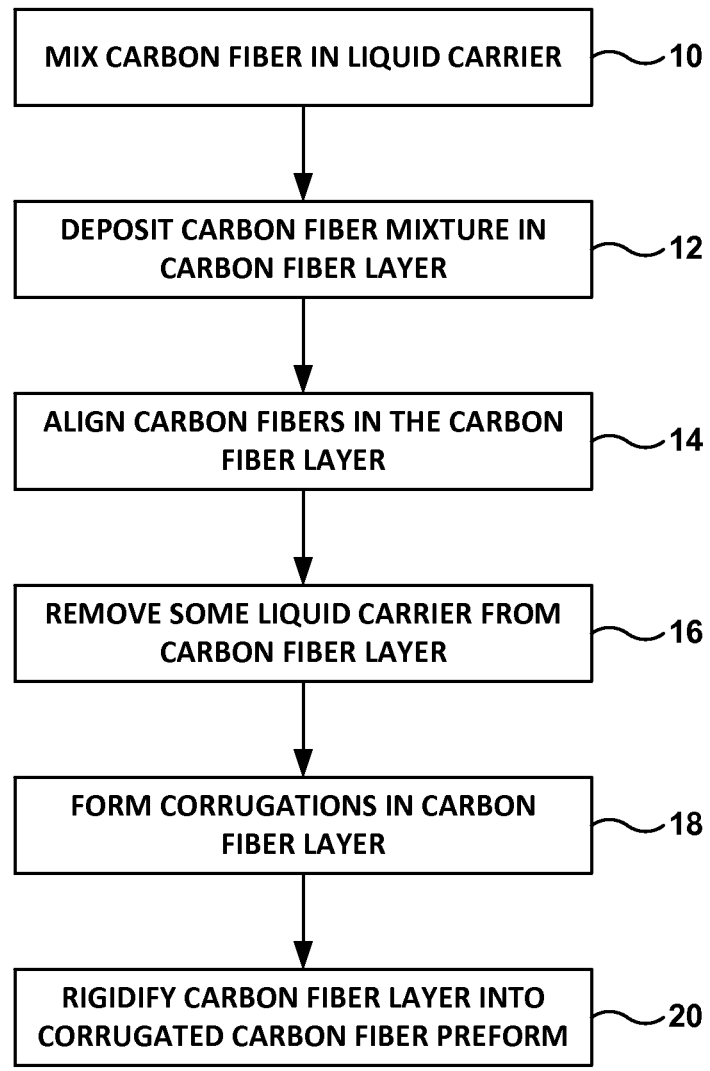
FIG. 1 is a flow diagram that illustrates an example technique for forming a corrugated carbon fiber preform.

In general, the disclosure is directed to a corrugated carbon fiber preform and methods for forming the corrugated carbon fiber preform. In addition, the disclosure is directed to a carbon-carbon composite material formed from at least two corrugated carbon fiber preforms and methods for forming the carbon-carbon composite material from at least two corrugated carbon fiber preforms.

In some examples, the method for forming the corrugated carbon fiber preform includes mixing a plurality of carbon fibers in a liquid carrier to form a carbon fiber mixture. The method also includes depositing the carbon fiber mixture in a layer. Once the carbon fiber mixture has been deposited in a layer, the method may include forming a plurality of corrugations in the layer to form a corrugated carbon fiber layer. The corrugations may include at least one ridge and at least one groove. The method may also include rigidifying the corrugated carbon fiber layer to form a corrugated carbon fiber preform.

The disclosure is also directed to a carbon-carbon composite material formed from at least two corrugated carbon fiber preforms and methods of forming the carbon-carbon composite material. In some examples, the method may include substantially aligning (e.g., aligning or nearly aligning) a first corrugated carbon fiber preform and a second corrugated carbon fiber preform. The first corrugated carbon fiber preform may define a first surface that includes at least one ridge. The second corrugated carbon fiber preform may define a first surface that includes at least one groove. In some examples, substantially aligning the first corrugated carbon fiber preform and the second corrugated carbon fiber preform includes substantially aligning the at least one ridge of the first surface of the first corrugated carbon fiber preform and the at least one groove of the first surface of the second corrugated carbon fiber preform.

The method of forming the carbon-carbon composite also may include bringing the first surface of the first corrugated carbon fiber preform into contact with the first surface of the second corrugated carbon fiber preform. In some examples, the corrugations in the first corrugated carbon fiber preform and the corrugations in the second corrugated carbon fiber preform may result in at least a portion of the first surface of the first corrugated carbon fiber preform being substantially parallel (e.g., parallel or nearly parallel) to at least a portion of the first surface of the second corrugated carbon fiber preform when the corrugated carbon fiber preforms are substantially aligned. This may allow at least a portion of the first surface of the first corrugated carbon fiber preform to contact at least a portion of the second surface of the second corrugated carbon fiber preform.

In some examples, the method of forming the carbon-carbon composite material includes densifying the first corrugated carbon fiber preform and the second corrugated carbon fiber preform to bond the first corrugated carbon fiber preform and the second carbon fiber preform. The method of forming the carbon-carbon composite material also may include machining a second surface of the first corrugated carbon fiber preform to remove at least one ridge on the second surface of the first corrugated carbon fiber preform. The second surface of the first corrugated carbon fiber preform may be substantially opposite (e.g., opposite or nearly opposite) the first surface of the first corrugated carbon fiber preform, i.e., the first and second surfaces may face in substantially opposite directions. In some examples, machining the second surface may include forming a substantially planar surface, e.g., may include removing substantially all ridges on the second surface.

In some examples, the carbon-carbon composite material may include a plurality of carbon fibers that define long axes. In some cases, the corrugated carbon fiber preforms may include at least some carbon fibers whose long axes lie canted out of a plane defined by the corrugated carbon fiber preform. When assembled and formed into the carbon-carbon composite material, at least some of the carbon fibers whose long axes lie canted out of the plane of the corrugated carbon fiber preform may lie canted out of a plane of the carbon-carbon composite material. In some examples, carbon fibers that have long axes canted out of the plane of the carbon-carbon composite material may facilitate heat transfer in a direction out of the plane of the carbon-carbon composite material and/or may contribute to strength of the carbon-carbon composite material.

In some examples, the carbon-carbon composite material may be used as a friction material in mechanical systems. For example, the carbon-carbon composite material may be a brake disc, such as a stator disc and/or a rotor disc in a brake system of an aircraft. Although the following description is primarily refers to carbon-carbon composite materials used in brake disc systems of aircraft, the carbon-carbon composite materials may be used in other applications, as will be apparent to one of ordinary skill in the art.

FIG. 1 is a flow diagram that illustrates an example technique for forming a corrugated carbon fiber preform. The method of FIG. 1 includes mixing a plurality of carbon fibers in a liquid carrier to form a carbon fiber mixture (10). In some examples, the carbon fibers of the plurality of carbon fibers are provided in a tow. The tow may include any number of carbon fibers, such as 1,000, 2,000, 3,000, 4,000 or more individual carbon fibers per strand of tow.

The carbon fibers may be formed from any suitable precursor material, such as, for example, PAN, rayon, pitch, or any combination thereof. The carbon fibers may have different densities depending on which precursor material was used to form the carbon fibers. In some examples, the density of the carbon fibers may range between about 1.76 grams per cubic centimeter ($g/cm^3$) to about 1.9 $g/cm^3$.

The liquid carrier may be any carrier in which the plurality of carbon fibers can be mixed and which wets the plurality of carbon fibers. In some examples, the liquid carrier may later be substantially removed (e.g., completely removed or nearly completely removed) from the carbon fiber mixture (e.g., after forming the corrugated carbon fiber layer). When the liquid carrier is substantially fully removed, the liquid carrier may leave substantially no residue on the plurality of carbon fibers. In some examples in which the liquid carrier is later substantially removed from the carbon fiber mixture, the liquid carrier may be water or an alcohol, and may optionally include water softening chemicals, a surfactant, and/or a wetting agent. In other examples, the liquid carrier may be molten pitch. In some examples, the molten pitch may not be later removed from the carbon fiber mixture.

In examples in which the liquid carrier includes molten pitch, the pitch may include, for example, at least one of isotropic pitch or mesophase pitch. The pitch may be at least one of petroleum pitch, coal tar pitch, or synthetic pitch. In some examples, the pitch may have a density between about 1.27 grams per cubic centimeter ($g/cm^3$) and about 1.33 $g/cm^3$.

In some examples in which the liquid carrier includes molten pitch, the plurality of carbon fibers may be mixed into the molten pitch to a volume fraction of between about 15 volume percent (vol. % (volume of carbon fibers compared to total volume of the mixture)) and about 30 vol. %. For example, the plurality of carbon fibers may constitute between about 20 vol. % and about 25 vol. % of the mixture, or about 25 vol. % of the mixture.

In some examples, mixing the plurality of carbon fibers in the liquid carrier (10) includes defibrillating a fibrillated carbon fiber tow into a plurality of individual carbon fibers. Defibrillation of the carbon fibers may include separation of the yarn or tow into individual carbon fibers or into bundles that have fewer carbon fibers compared to the state prior to the defibrillation. Defibrillation may help improve the homogeneity of the carbon fibers in the molten pitch. For example, a carbon fiber tow may be deposited in the liquid carrier, and mixing of the carbon fiber tow in the liquid carrier may result in the individual carbon fibers separating from the tow into individual fibers. In some examples, the carbon fibers may be mixed into the liquid carrier in a relatively low shear continuous mixer, which may also defibrillate the carbon fiber tow into a plurality of individual carbon fibers. Other relatively low shear paddle mixers (e.g., batch mixers or continuous mixers) or banbury-type mixers may also be used to defibrillate the carbon fibers into a plurality of carbon fiber filaments.

In other examples, the carbon fiber may be defibrillated into individual carbon fibers prior to mixing the plurality of carbon fibers in the liquid carrier (10). For example, the plurality of carbon fiber may be provided in a tow, and the tow may be defibrillated prior to depositing the plurality of carbon fibers in the liquid carrier. For example, the carbon fibers may be defibrillated into a plurality of individual carbon fibers in a mixer, such as a relatively low shear continuous mixer. Other relatively low shear paddle mixers (e.g., batch mixers or continuous mixers) or banbury-type mixers may also be used to defibrillate the carbon fibers into a plurality of individual carbon fibers.

Regardless of whether the plurality of carbon fiber are defibrillated prior to or during mixing the carbon fibers in the liquid carrier (10), in some examples, the plurality of carbon fibers may be substantially fully defibrillated after mixing the plurality of carbon fibers in the liquid carrier (10). For example, substantially all or all of the carbon fibers may be present within the liquid carrier as single fibers. Stated another way, in examples in which the carbon fibers are substantially fully defibrillated, substantially none or less than 10% (such as between 5% and 10%) of the carbon fibers are present within the liquid carrier in a bundle of multiple fibers weaved together, e.g., in a tow.

In some examples, the plurality of carbon fibers may not be substantially fully defibrillated after mixing the plurality of fibers in the liquid carrier (10). For example, at least some of the carbon fibers may be present in a tow, bundle, or other collection of multiple fibers.

In some examples, the mixer in which the plurality of carbon fibers and liquid carrier are mixed may be a relatively low shear continuous mixer. Other relatively low shear paddle mixers (e.g., batch mixers or continuous mixers) or banbury-type mixers may also be used to mix the plurality of carbon fibers and the liquid carrier. By using a relatively low shear mixer, in some examples, the carbon fibers and liquid carrier may be mixed without breaking substantially any (e.g., none or nearly none) of the carbon fibers. For example, in some implementations, an average length of the plurality of carbon fibers may be substantially the same (e.g., the same or nearly the same, such as greater than about 80% of the original length or greater than about 90% of the original length) before being mixed in liquid carrier and after the mixing step (10) is complete. For example, the average length of the carbon fibers before mixing may be between about 6.35 millimeters (mm; about ¼ inch) and about 50.8 mm (about 2 inches). Continuing this example, the average length of the carbon fibers after mixing may be between about 6.35 mm (about ¼ inch) and about 50.8 mm (about 2 inches). When the average length of the plurality of carbon fibers is substantially unchanged (e.g., unchanged or nearly unchanged) by the mixing process, properties of the final carbon-carbon composite material can be predicted based on the properties of the starting materials, including the carbon fibers.

In other examples, mixing the plurality of carbon fibers and the liquid carrier (10) may break some of the carbon fibers. In some examples, breaking the carbon fibers may result in carbon fibers with a range of lengths. The range of lengths may result in smaller carbon fibers being disposed between larger carbon fibers in the mixture and/or the corrugated carbon fiber preform, which may result in the corrugated carbon fiber preform possessing increased strength compared to a corrugated carbon fiber preform that includes carbon fiber filaments of a substantially single length. In some examples, mixing the plurality of carbon fibers and the liquid carrier (10) may break up to about 40% of the carbon fibers, such as between about 30% and about 40% of the carbon fibers.

In some examples, mixing the plurality of carbon fibers and liquid carrier (10) may continue until the mixture of carbon fibers and liquid carrier is substantially homogeneous (e.g., homogeneous or nearly homogeneous), e.g., until the carbon fibers are substantially evenly distributed throughout the liquid carrier. In some examples in which the liquid carrier is a molten pitch, the substantially homogeneous mixture of carbon fibers and molten pitch may have a density between about 1.3 grams per cubic centimeter (g/cm$^3$) and about 1.4 g/cm$^3$. In other examples, mixing of the plurality of carbon fibers and liquid carrier (10) may stop before a substantially homogeneous mixture has been formed.

In some examples in which the liquid carrier is a molten pitch, mixing the plurality of carbon fibers and liquid carrier (10) may include mixing at least one additive with the molten pitch and plurality of carbon fibers. The at least one additive may modify one or more properties of the molten pitch, the plurality of carbon fibers, and/or the carbon-carbon composite material formed from the mixture of the molten pitch and the plurality of carbon fibers. In some examples, the at least one additive includes a friction modifier, such as titanium (Ti) or silica (SiO$_2$). In some examples, the at least one additive additionally or alternatively includes an oxidizer, such as a peroxide. An oxidizer may stabilize synthetic pitch, and may reduce or eliminate the need for a subsequent oxidation step to stabilize a corrugated carbon fiber preform formed with synthetic pitch. In some examples, the at least one additive may be mixed into the molten pitch to a concentration of less than about 10 weight percent (wt. %), such as between about 1 wt. % and about 10 wt. % (based on the total mixture, including the molten pitch, at least one additive, and plurality of carbon fibers). In some examples, the friction modifier may be mixed into the molten pitch to a concentration of less than about 10 wt. %, such as between about 1 wt. % and about 10 wt. %. In some examples, the oxidizer may be mixed into the molten pitch to a concentration of less than about 10 wt. %, such as between about 1 wt. % and about 10 wt. %.

In some implementations, the at least one additive may be mixed with the molten pitch and the plurality of carbon fibers in the same step as the plurality of carbon fibers, e.g., the at least one additive may be deposited in the molten pitch substantially simultaneously (e.g., simultaneously or nearly simultaneously) with the plurality of carbon fibers. In other implementations, the at least one additive may be mixed with the molten pitch and the plurality of carbon fibers using the same mixing apparatus as the apparatus used for mixing the plurality of carbon fibers and the molten pitch, but the at least one additive may be deposited in the molten pitch before and/or after the plurality of carbon fibers are deposited in the molten pitch. In other implementations, the at least one additive may be mixed with the molten pitch and the plurality of carbon fibers in a different apparatus than the apparatus used for mixing the plurality of carbon fibers and the molten pitch. Additionally, in examples in which more than one additive is mixed with the molten pitch and the plurality of carbon fibers, the additives may be mixed with the molten pitch and the plurality of carbon fibers at substantially the same time or at different times, and/or may be mixed with the molten pitch and the plurality of carbon fibers using the same or different apparatuses.

In some examples, the at least one additive may be mixed with the molten pitch and the plurality of carbon fibers until the at least one additive is mixed substantially homogenously in the molten pitch. In other examples, the at least one additive may not be homogeneously mixed in the molten pitch.

In accordance with the example shown in FIG. 1, after the plurality of carbon fibers and liquid carrier have been mixed to form a carbon fiber mixture (10), the carbon fiber mixture is deposited in a carbon fiber layer (12). In some examples, such as when the liquid carrier is water or another liquid carrier that will be removed from the carbon fiber mixture, the carbon fiber mixture may be deposited on a wire mesh, which may result in at least some of the water or other liquid carrier draining through the mesh. In other examples, the carbon fiber mixture may be deposited on another surface that does not allow draining of the liquid carrier, e.g., when the liquid carrier is molten pitch.

In some examples, the carbon fiber layer may be formed from the carbon fiber mixture to a predetermined thickness, e.g., by depositing a predetermined volume of carbon fiber mixture in a mold. In some examples, the carbon fiber mixture may be deposited on a moving wire mesh, and the thickness of the carbon fiber layer may be controlled by a speed at which the wire mesh is moving. For example, when the carbon fiber mixture is deposited on a slowly moving wire mesh, the resulting carbon fiber layer may be thicker than when the carbon fiber mixture is deposited on a faster moving wire mesh. Additionally or alternatively, the thickness of the carbon fiber layer may be controlled by a gate or knife disposed at a predetermined height over the wire mesh. The gate or knife may control an amount of carbon fiber than can pass between the wire mesh and the gate or knife. In this way, the gate or knife may result in a carbon fiber layer with a substantially constant, predetermined thickness.

Figure 2:
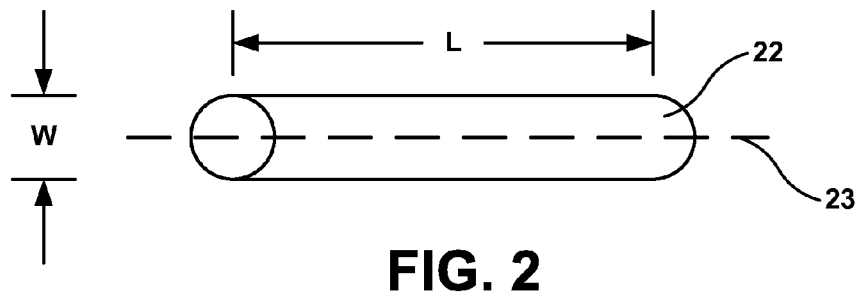
FIG. 2 is a conceptual diagram of a carbon fiber.

In some examples, the method may optionally include substantially aligning the plurality of carbon fibers in the carbon fiber layer (14). FIG. 2 is a conceptual diagram that illustrates an example carbon fiber 22. As shown in FIG. 2, carbon fiber 22 defines a length L along a long axis 23 (e.g., a major axis) of fiber 22 and a width W in a direction normal to the length L of fiber 22.

Figure 3:
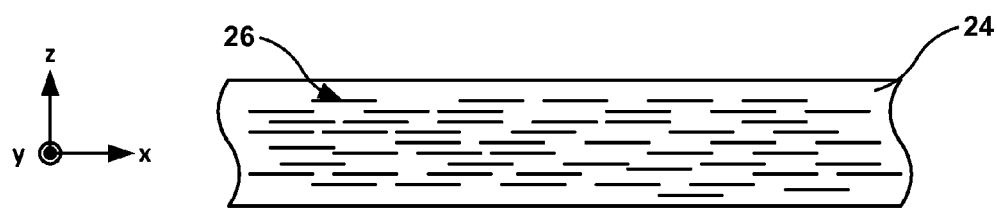
FIG. 3 is a conceptual cross-sectional diagram that illustrates an example carbon fiber layer that includes a plurality of substantially aligned carbon fibers.

In some examples, as shown in FIG. 3, substantially aligning the plurality of carbon fibers in the carbon fiber layer (14) may include substantially aligning (e.g., aligning or nearly aligning) the long axes of a plurality of carbon fibers along a plane of carbon fiber layer 24. FIG. 3 is a conceptual cross-sectional diagram that illustrates a carbon fiber layer 24 and a plurality of carbon fibers 26. As shown in FIG. 3, the long axes of the carbon fibers 26 are substantially aligned with a plane of carbon fiber layer 24 (e.g., in the direction of the x-y plane of FIG. 3, where orthogonal x-y-z axes are shown in FIG. 3, as well as the other figures, for ease of description only). In some examples, when a long axis of a respective one of carbon fibers 26 is substantially aligned in the direction of the x-y plane of FIG. 3, the long axis may be oriented between +5 degrees and −5 degrees out of the x-y plane. Although all of the long axes of carbon fibers 26 are illustrated as being substantially aligned in the x-y plane of FIG. 3, in some examples, fewer than all of the long axes of carbon fibers 26 may be substantially aligned in the x-y plane. For example, some of carbon fibers 26 may have long axes substantially aligned in the x-y plane and some of carbon fibers 26 may have long axes oriented randomly in carbon fiber layer 24 (e.g., canted out of the x-y plane of FIG. 3).

Substantially aligning the plurality of carbon fibers in the carbon fiber layer (14) may be accomplished in any suitable manner. In some examples, when the liquid carrier in the carbon fiber layer includes water, the carbon fiber layer may be deposited on a wire mesh, and a vacuum may be applied to a surface of the wire mesh opposite the carbon fiber layer, which may substantially align at least some of the long axes of the plurality of carbon fibers 26 in the carbon fiber layer 24 in a plane parallel to the plane of the wire mesh (e.g., as shown in FIG. 3). Other methods may also be used to substantially align the plurality of carbon fibers, such as mechanical smoothing or shaking, or due to the manner in which the mixture is deposited in the carbon fiber layer. For example, the mixture may be flowed into a mold in a way that results in the carbon fibers 26 being substantially aligned within the carbon fiber layer 24. In some examples, carbon fiber layer 24 may define a thickness of about 3.175 millimeters ((mm) about ⅛ inch, e.g., measured in the z-axis direction of FIG. 3), although carbon fiber layer 24 may define other thicknesses in other examples.

Figure 4:
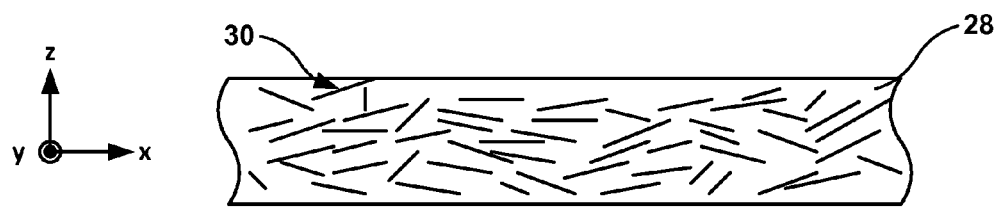
FIG. 4 is a conceptual cross-sectional diagram that illustrates an example carbon fiber layer that includes a plurality of randomly oriented carbon fibers.

In some examples, the carbon fibers may not have long axes substantially aligned in the plane of the carbon fiber layer. FIG. 4 is a conceptual cross-sectional diagram that illustrates a carbon fiber layer 28 that includes a plurality of carbon fibers 30 that are randomly oriented within layer 28. As described above, in some examples, some of the carbon fibers (e.g., carbon fibers 26) may have long axes substantially aligned within the layer and some of the carbon fibers may be randomly oriented within layer 28.

Returning now to FIG. 1, in some implementations, the method also optionally includes removing some of the liquid carrier from the carbon fiber layer (16). For example, when the liquid carrier includes water, some of the water may be removed from the carbon fiber layer, either during the step of substantially aligning the carbon fibers in the carbon fiber layer (12) and/or in a separate step before or after substantially aligning the carbon fibers in the carbon fiber layer (12). In some examples, some of the liquid carrier may be left in the carbon fiber layer (i.e., may not be removed from the carbon fiber layer), thereby leaving the carbon fiber layer somewhat "wet." In some implementations, leaving the carbon fiber layer somewhat "wet" may facilitate forming a plurality of corrugations in the carbon fiber layer (18).

In some examples, the method does not include removing some of the liquid carrier from the carbon fiber layer (16). For example, when the liquid carrier includes molten pitch, the method may or may not include removing some of the molten pitch.

The method shown in FIG. 1 may also include forming a plurality of corrugations in the carbon fiber layer (18). The plurality of corrugations may include at least one groove and at least one ridge. In some examples, the plurality of corrugations may be formed in the carbon fiber layer (18) using a groover, which is configured to remove material from the carbon fiber layer to form a plurality of grooves in the carbon fiber layer (and leaves a plurality of ridges, e.g., a ridge between an adjacent pair of grooves). In other examples, the plurality of corrugations may be formed in the carbon fiber layer (18) using a crimper, or by folding the carbon fiber layer, which does not remove any material or as much material from the carbon fiber layer compared to the groover.

Figure 5:
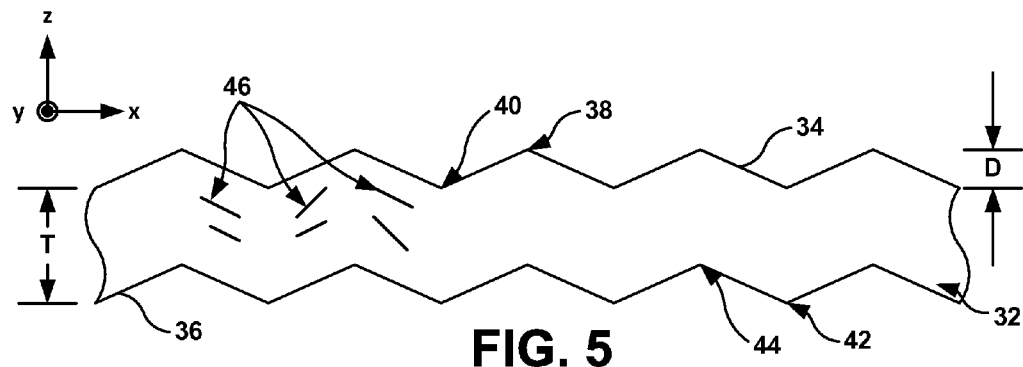
FIG. 5 is a conceptual cross-sectional diagram that illustrates an example corrugated carbon fiber preform.
Figure 6:
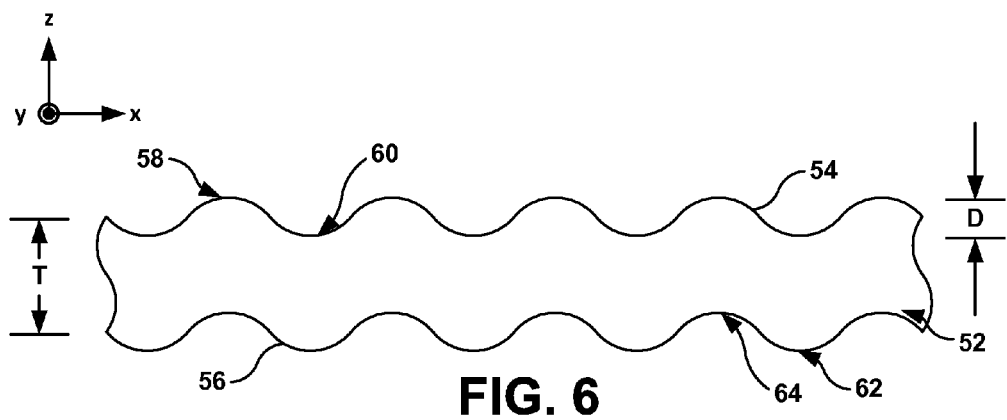
FIG. 6 is a conceptual cross-sectional diagram that illustrates another example corrugated carbon fiber preform.
Figure 7:
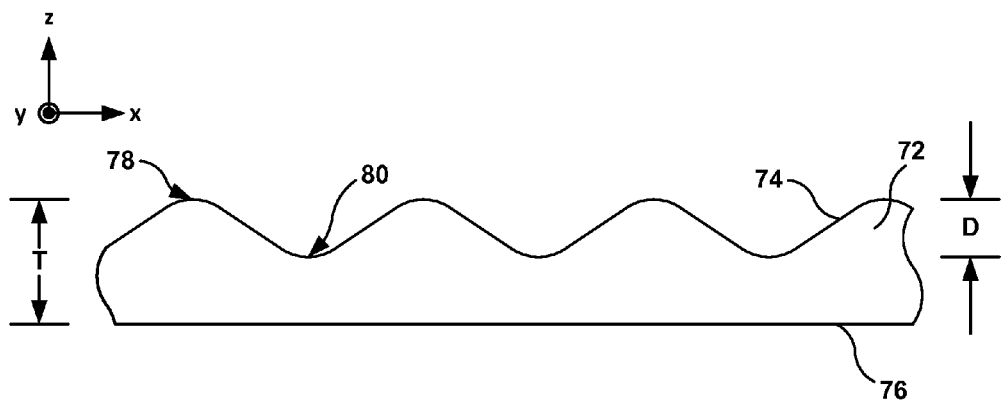
FIG. 7 is a conceptual cross-sectional diagram that illustrates another example corrugated carbon fiber preform.

FIGS. 5-7 are conceptual cross-sectional diagrams that illustrate various examples of corrugations that may be formed in the carbon fiber layer.

FIG. 5 illustrates a carbon fiber layer 32 that defines a first surface 34 and a second surface 36. Carbon fiber layer 32 defines a layer that is generally parallel to the x-y plane shown in FIG. 5. First surface 34 of carbon fiber layer 32 includes a plurality of ridges 38 interleaved with a plurality of grooves 40. Second surface 36 of carbon fiber layer 32 includes a plurality of ridges 42 interleaved with a plurality of grooves 44. In some examples, as illustrated in FIG. 5, a ridge 38 on first surface 34 may be substantially aligned (e.g., aligned or nearly aligned) with a groove 44 in second surface 36 (e.g., along a z-axis direction in FIG. 5), and a groove 40 on first surface 34 may be substantially aligned (e.g., aligned or nearly aligned) with a ridge 42 on second surface 36. When a ridge 38 on first surface 34 is substantially aligned with a groove 44 on second surface 36, carbon fiber layer 32 may have a substantially constant thickness (e.g., a constant or nearly constant thickness as measured in the z-axis direction in FIG. 5). In other examples, a ridge 38 on first surface 34 may be substantially aligned with a ridge 42 on second surface 36 or may not be substantially aligned with either a ridge 42 or groove 44 on second surface 36, and carbon fiber layer 32 may not have a substantially constant thickness (e.g., measured in the z-axis direction in FIG. 5).

As shown in FIG. 5, carbon fiber layer 32 includes a plurality of carbon fibers 46. In some examples, long axes of at least some of the plurality of carbon fibers 46 may be canted (e.g., angled) out of the x-y plane. For example, long axes of at least some of the plurality of carbon fibers 46 may have component of their orientation in the z-axis direction of FIG. 5. In some examples, at least some of the long axes of the plurality of carbon fibers 46 may be substantially parallel (e.g., parallel or nearly parallel) to at least one of first surface 34 and/or second surface 36.

In some examples, as shown in FIG. 5, the grooves 40, 44, and/or ridges 38, 42 may define relatively sharp edges. In other examples, as shown in FIG. 6, a carbon fiber layer 52 may define ridges with relatively rounded edges. Carbon fiber layer 52 defines a first surface 54 that includes at least one ridge 58 and at least one groove 60 and a second surface 56 that includes at least one ridge 62 and at least one groove 64. As shown in FIG. 6, ridges 58, 62 and grooves 60, 64 may include rounded edges. In some examples, a carbon fiber layer may include some ridges and/or grooves that define relatively sharp edges (e.g., grooves 40, 44, and/or ridges 38, 42) and some ridges and/or grooves that define rounded edges (e.g., ridges 58, 62 and grooves 60, 64). Carbon fiber layer 52 may include any configuration of corrugations (e.g., ridges and/or grooves), and at least some of the corrugations may be configured to mate or nest with another carbon fiber layer that includes a complimentary configuration of corrugations.

In some examples, as shown in FIG. 7, carbon fiber layer 72 may define a first surface 74 that includes at least one ridge 78 and at least one groove 80 and a second surface 76 that is substantially planar (e.g., planar or nearly planar in the direction of the x-y plane of FIG. 7). Although ridge 78 and groove 80 are shown in FIG. 7 as defining rounded edges, in some examples, ridge 78 and/or groove 80 may define relatively sharp edges.

In some examples, carbon fiber layer 32, 52 may define a thickness T (FIGS. 5-7) of about 3.175 mm (about ⅛ inch, e.g., measured in a direction of the z-axis of FIGS. 5-7). As shown in FIGS. 5 and 6, in examples in which a groove 40, 60 of first surface 34, 54, respectively, is substantially aligned with a ridge 42, 64 of second surface 36, 56, respectively, the thickness T of carbon fiber layer 32, 52 may be measured between the groove 40, 60 and the ridge 42, 64, respectively. As shown in FIG. 7, in examples in which second surface 76 is substantially planar, carbon fiber layer 72 may include a non-uniform thickness, and a thickness T of carbon fiber layer 72 may be measured from second surface 76 to ridge 78. In some examples, a depth D (FIGS. 5-7) of grooves 40, 44, 60, 64, 80, 84 relative to ridges 38, 42, 58, 62, 78 may be between about 1.5875 mm (about 1/16 inch) and about 2.38125 mm (about 3/32 inch).

Figure 8:
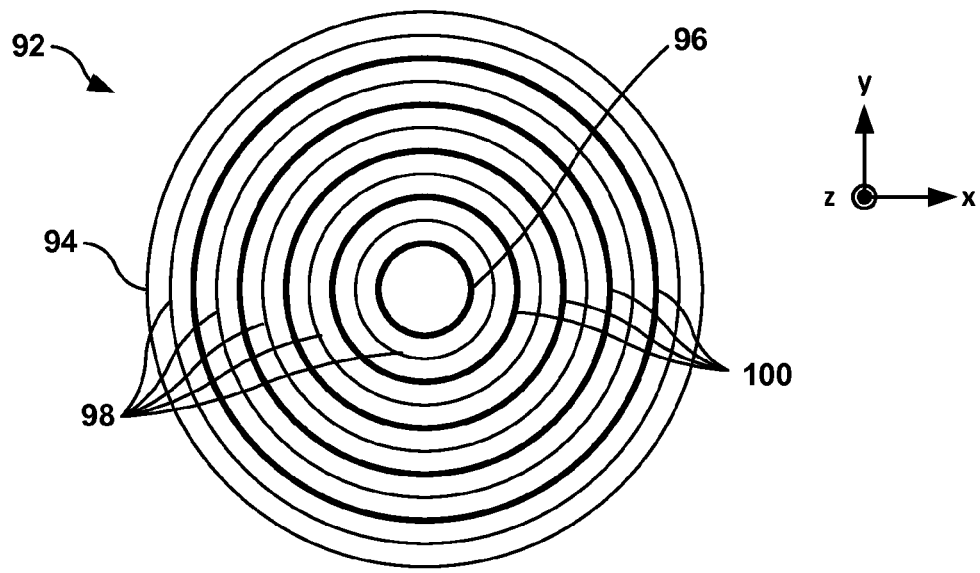
FIG. 8 is a conceptual plan diagram that illustrates an example corrugated carbon fiber preform.
Figure 9:
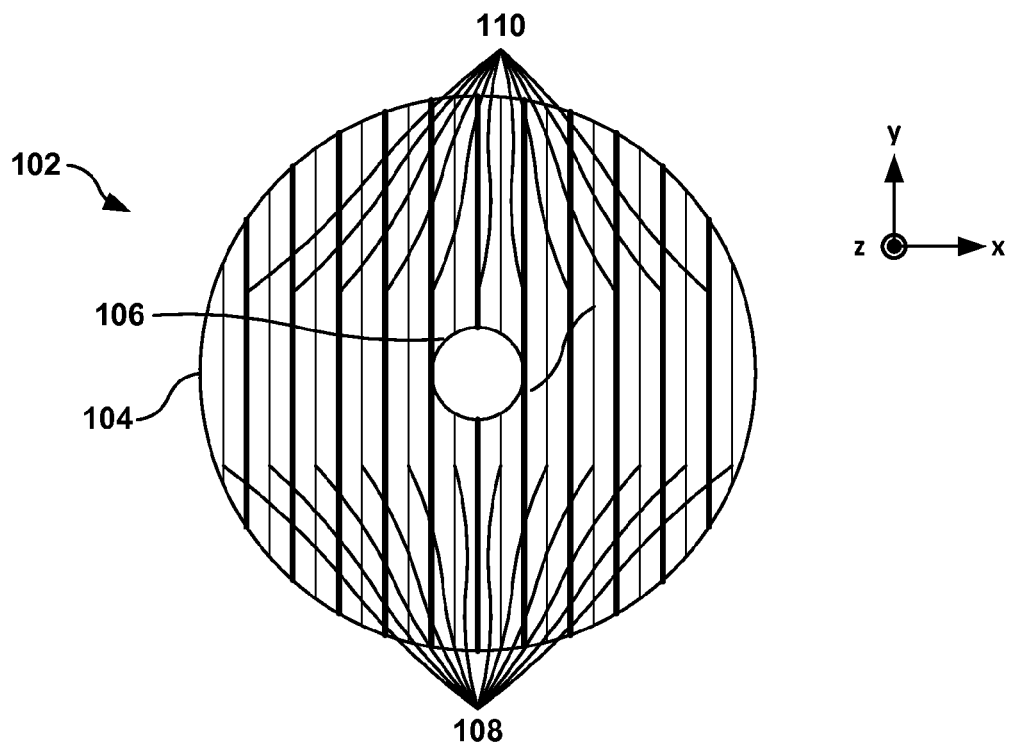
FIG. 9 is a conceptual plan diagram that illustrates another example corrugated carbon fiber preform.

FIGS. 8 and 9 are plan diagrams of examples of carbon fiber layers. As shown in FIG. 8, in some examples, a carbon fiber layer 92 may define an annular shape between an inner circumference or perimeter 96 and an outer perimeter or circumference 94. Carbon fiber layer 92 may define a plurality of grooves 98 interleaved with a plurality of ridges 100. Grooves 98 and ridges 100 are formed as concentric circles. Grooves 98 and ridges 100 may take on any shape, such as a shape described with respect to FIGS. 5-7.

As shown in FIG. 9, in other examples, a carbon fiber layer 102 may define an annular shape between an inner circumference or perimeter 106 and an outer perimeter or circumference 104. Carbon fiber layer 102 may define a plurality of grooves 108 interleaved with a plurality of ridges 110. In the example of FIG. 9, grooves 108 and ridges 110 are substantially linear (e.g., linear or nearly linear) and substantially parallel (e.g., parallel or nearly parallel) to each other. Grooves 108 and ridges 110 may take on any shape, such as a shape described with respect to FIGS. 5-7.

In other examples, grooves 98, 108 and ridges 100, 110 may have different shapes. For example, grooves 98, 108 and ridges 100, 110 may have sinusoidal or other curved shapes when viewed from above the surface of carbon fiber layer 92, 102 (e.g., as shown in FIGS. 8 and 9).

Additionally or alternatively, while FIGS. 8 and 9 illustrate carbon fiber layers 92, 102 as defining annular shapes, in other examples, carbon fiber layers 92, 102 may define other shapes, such as a square, a rectangle, an ellipse, or any other suitable shape. Additionally, while carbon fiber layers 92, 102 define inner circumferences or perimeters 96, 106, in other examples, carbon fiber layers 92, 102 may not define inner circumferences or perimeters 96, 106.

Returning again to FIG. 1, the method of FIG. 1 also includes rigidifying the carbon fiber layer (e.g., layer 32, 52, 72, 92, 102) into a corrugated carbon fiber preform (20). In some examples, such as when the liquid carrier includes water, rigidifying the carbon fiber layer (20) includes removing water from the carbon fiber layer. Removing the water may be accomplished, for example, by heating the carbon fiber layer and/or applying low pressure to the carbon fiber layer to facilitate evaporation of water.

In other examples, such as when the liquid carrier includes molten pitch, rigidifying the carbon fiber layer (20) includes cooling the carbon fiber layer to solidify the molten pitch.

The corrugated carbon fiber preform may have a shape similar to or substantially the same as the carbon fiber layer, e.g., carbon fiber layers 32, 52, 72, 92, 102 illustrated in FIGS. 5-9.

The method illustrated in FIG. 1 may allow formation of a corrugated carbon fiber preform from carbon fibers. In some cases, needling sheets of carbon fiber precursor material together has been used to form a preform, which is subsequently carbonized to form a carbon fiber preform. Needling may result in at least some of the carbon fiber precursor material being oriented in a z-axis direction. Such a process utilizes two steps which may be time consuming and/or expensive: needling and carbonization of the carbon fiber precursor material to form carbon fibers.

In some cases, to remove the carbonization step, it can be desirable to form a preform directly from carbon fiber, instead of a carbon fiber precursor material. However, effectively needling carbon fiber is difficult or impossible, because carbon fiber is brittle and may be broken by needling. Other methods have attempted to utilize random chopped carbon fibers, but random chopped carbon fibers have a limited amount of z-oriented fibers, which may result in strength and friction properties that are worse than desired.

In some examples, utilizing carbon fibers to form a preform may be advantageous compared to forming a preform from a carbon fiber precursor material, such as PAN, or utilizing random chopped carbon fibers. In contrast, the method of FIG. 1 utilizes carbon fiber to form the preform. The method of FIG. 1 does not include needling any material, and does not include a step of carbonizing carbon fiber precursor material to form carbon fiber after forming the preform.

Additionally, the method of FIG. 1 may result in a corrugated carbon fiber preform that includes carbon fibers that are oriented out of the plane of the carbon fiber preform (e.g., as shown and described with respect to FIG. 5, with at least some of the carbon fibers having a z-axis component to their orientation). In some examples, this may provide desirable properties to the corrugated carbon fiber preform and/or to a carbon-carbon composite material formed from the corrugated carbon fiber preform. For example, a corrugated carbon fiber preform may be better able to withstand forces (e.g., shear forces) exerted on the preform by subsequent processing (e.g., densification) compared to a preform that does not include carbon fibers oriented out of the plane of the carbon fiber preform. As another example, the corrugation may help orient and join (e.g., restrain) a first corrugated carbon fiber preform and a second corrugated carbon fiber preform during subsequent processing without needling the first and second preforms together.

As an additional example, a carbon-carbon composite material formed using at least one corrugated carbon fiber preform may exhibit increased structural strength and/or better thermal conductivity in a direction normal to the plane of the carbon-carbon composite material due to the inclusion of carbon fibers having a long axis oriented out of the plane of the carbon-carbon composite material. The increased thermal conductivity and/or structural strength may result in improved friction properties compared to a carbon-carbon composite material with a lower number of carbon fibers having a long axis oriented out of the plane of the carbon-carbon composite material.

Figure 10:
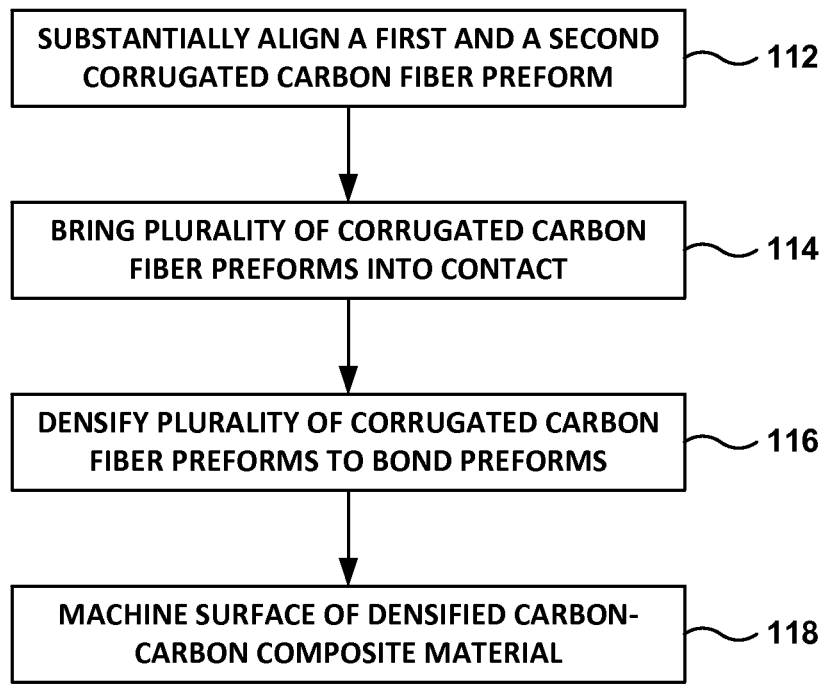
FIG. 10 is a flow diagram that illustrates an example technique for forming a carbon-carbon composite material from at least two corrugated carbon fiber preforms.
Figure 11:
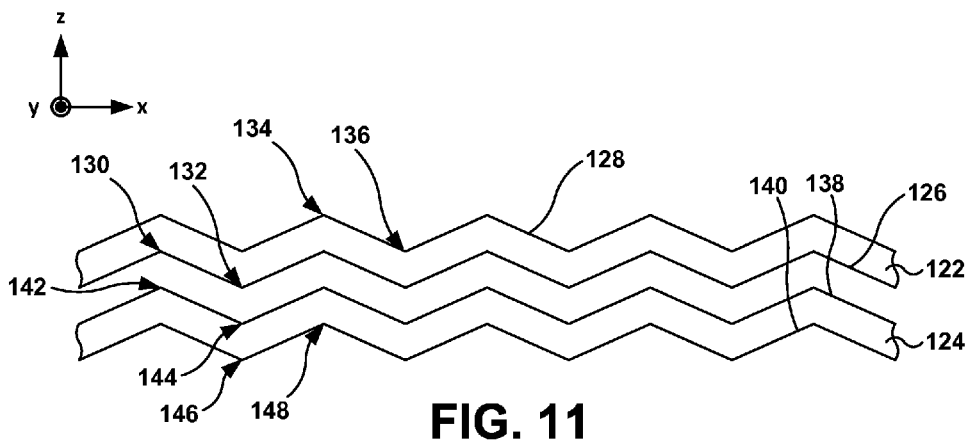
FIG. 11 is a conceptual cross-sectional diagram that illustrates an example of a plurality of substantially aligned corrugated carbon fiber preforms.
Figure 12:
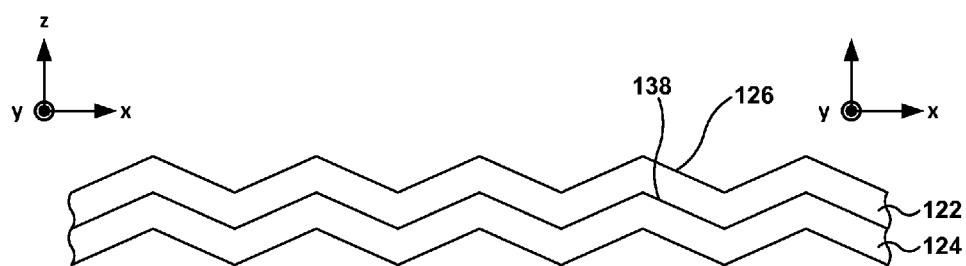
FIG. 12 is a conceptual cross-sectional diagram that illustrates an example of a plurality of substantially aligned corrugated carbon fiber preforms in contact.
Figure 13:
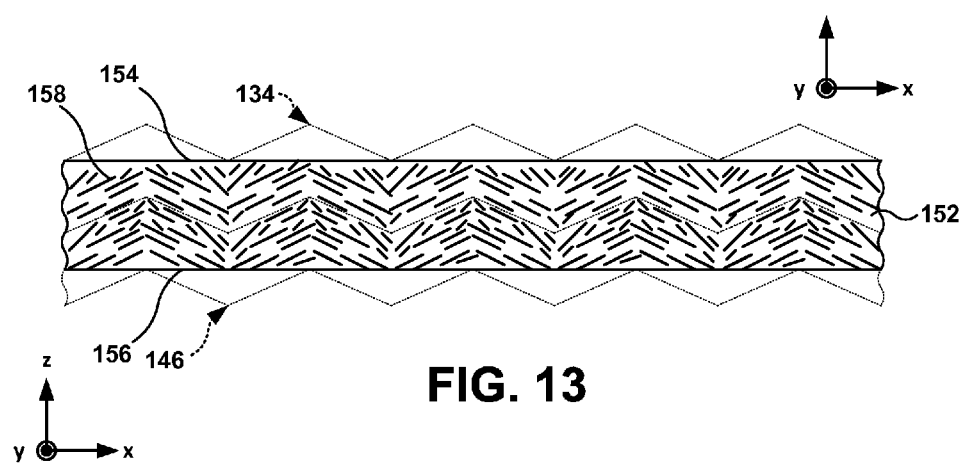
FIG. 13 is a conceptual cross-sectional diagram that illustrates an example of a carbon-carbon composite material formed from a plurality of corrugated carbon fiber preforms.

FIG. 10 is a flow diagram that illustrates an example technique for forming a carbon-carbon composite material using at least two corrugated carbon fiber preforms. In some examples, the corrugated carbon fiber preforms may be formed using the method described with respect to FIG. 1. Accordingly, the corrugated carbon fiber preforms may have a shape and composition similar to or substantially the same as the shape of carbon fiber layers 32, 52, 72, 92, and/or 102 illustrated with respect to FIGS. 5-9. For purposes of illustration, the method of FIG. 10 will be described with concurrent reference to FIGS. 11-13. FIGS. 11-13 are conceptual cross-sectional diagrams that illustrate various stages of the method of FIG. 10. However, in other examples, the method may be performed using other corrugated carbon fiber preforms or using other numbers of corrugated carbon fiber preforms.

The method of FIG. 10 includes substantially aligning a first corrugated carbon fiber preform 122 and a second corrugated carbon fiber preform 124 (112), as shown in FIG. 11. First corrugated carbon fiber preform 122 may define a first surface 126 and a second surface 128 substantially opposite (e.g., opposite or nearly opposite) to first surface 126. That is, first and second surfaces 126, 128, respectively, face in opposite directions. First surface 126 includes a plurality of corrugations, which include a plurality of ridges 132 interleaved with a plurality of grooves 130. Second surface 128 includes a plurality of corrugations, which include a plurality of ridges 134 interleaved with a plurality of grooves 136. In some examples, as shown in FIG. 11, the grooves 130 of first surface 126 are substantially aligned (e.g., aligned or nearly aligned) with the ridges 134 of second surface 128 and the ridges 132 of first surface 126 are substantially aligned (e.g., aligned or nearly aligned) with the grooves 136 of second surface 128. In other examples, as described above, the grooves 130 of first surface 126 may not be aligned with the ridges 134 of second surface and the ridges 132 of first surface 126 may not be aligned with the grooves 136 of second surface 128.

In the example shown in FIG. 11, second corrugated carbon fiber preform 124 defines a first surface 138 and a second surface 140 substantially opposite to first surface 138. That is, first and second surfaces 138, 140, respectively, face in opposite directions. First surface 138 includes a plurality of corrugations, which include a plurality of ridges 142 interleaved with a plurality of grooves 144. Second surface 140 includes a plurality of corrugations, which include a plurality of ridges 146 interleaved with a plurality of grooves 148.

As shown in FIG. 11, substantially aligning first corrugated carbon fiber preform 122 and second corrugated carbon fiber preform 124 (112) may include substantially aligning (e.g., aligning or nearly aligning) a groove 130 on first surface 126 of first corrugated carbon fiber preform 122 with a ridge 142 on first surface 138 of second corrugated carbon fiber preform 124. Additionally or alternatively, substantially aligning first corrugated carbon fiber preform 122 and second corrugated carbon fiber preform 124 (112) may include substantially aligning a ridge 132 on first surface 126 of first corrugated carbon fiber preform 122 with a groove 144 on first surface 138 of second corrugated carbon fiber preform 124. In some examples in which first surface 126 of first corrugated carbon fiber preform 122 includes a plurality of grooves 130 and a plurality of ridges 132 and first surface 138 of second corrugated carbon fiber preform 124 includes a plurality of grooves 144 and a plurality of ridges 142, substantially aligning first corrugated carbon fiber preform 122 and second corrugated carbon fiber preform 124 (112) may include substantially aligning respective ridges 132 on first surface 126 of first corrugated carbon fiber preform 122 with respective grooves 144 on first surface 138 of second corrugated carbon fiber preform 124 and/or aligning respective grooves 130 on first surface 126 of first corrugated carbon fiber preform 122 with respective ridges 142 on first surface 138 of second corrugated carbon fiber preform 124.

The method of FIG. 10 also includes bringing first surface 126 of first corrugated carbon fiber preform 122 into contact with first surface 138 of second corrugated carbon fiber preform 124 (114), as shown in FIG. 12. In some examples, the entire first surface 126 may not contact the entire first surface 138. For example, in some implementations, first corrugated carbon fiber preform 122 and/or second corrugated carbon fiber preform 124 may be porous. For example, as described above with respect to FIG. 1, the method of forming first corrugated carbon fiber preform 122 and/or second corrugated carbon fiber preform 124 may utilize a liquid carrier such as water. In some examples, once the water is removed, first corrugated carbon fiber preform 122 and/or second corrugated carbon fiber preform 124 may include a plurality of carbon fibers in a layer. The plurality of carbon fibers may contact each other, but first corrugated carbon fiber preform 122 and/or second corrugated carbon fiber preform 124 also may include pores (e.g., voids) between the plurality of carbon fibers.

In examples in which molten pitch is the liquid carrier, first corrugated carbon fiber preform 122 and/or second corrugated carbon fiber preform 124 may also be porous. Alternatively or additionally, when molten pitch is the liquid carrier, first surface 126 and or first surface 138 may be rough.

Regardless of whether first corrugated carbon fiber preform 122 and/or second corrugated carbon fiber preform 124 are porous and/or surfaces 126, 138 are rough, at least a portion of first surface 126 may contact at least a portion of first surface 138. For example, as shown in FIGS. 11 and 12, first surface 126 of preform 122 may be substantially parallel (e.g., parallel or nearly parallel) to first surface 138 of preform 124 when first corrugated carbon fiber preform 122 is substantially aligned with second corrugated carbon fiber preform 124. Hence, in some examples, first corrugated carbon fiber preform 122 and second corrugated carbon fiber preform 124 may be configured such that first surface 126 and first surface 138 contact each other over a majority or substantially all of first surface 126 and first surface 138 when first corrugated carbon fiber preform 122 and second corrugated carbon fiber preform 124 are substantially aligned.

Stated another way, bringing first corrugated carbon fiber preform 122 and second corrugated carbon fiber preform 124 into contact (114) may result in ridge 132 being received by or mated with groove 144. Similarly, bringing first corrugated carbon fiber preform 122 and second corrugated carbon fiber preform 124 into contact (114) may result in ridge 142 being received by or mated with groove 130. In this way, the pattern of grooves 130 and ridges 132 on first surface 126 of first corrugated carbon fiber preform 122 may be complimentary to the pattern of grooves 144 and ridges 142 on first surface 138 of second corrugated carbon fiber preform 124, and first surface 126 may mate with first surface 138 when first corrugated carbon fiber preform 122 and second corrugated carbon fiber preform 124 are substantially aligned (112) and brought into contact (114). In some examples, forming first corrugated carbon fiber preform 122 and second corrugated carbon fiber preform 124 such that first surface 126 and first surface 138 mate may result in a minimization of free space between first corrugated carbon fiber preform 122 and second corrugated carbon fiber preform 124, which may be desirable when using first corrugated carbon fiber preform 122 and second corrugated carbon fiber preform 124 to form a friction material, such as a brake disc.

Because first surface 126 and first surface 138 mate, the respective ridges 132, 142 and respective grooves 130, 144 may reduce or restrict relative motion between first corrugated carbon fiber preform 122 and second corrugated carbon fiber preform 124 during subsequent processing and/or handling without requiring needling of preforms 122, 124 together. Hence, the method of FIG. 10 may not include needling to join first corrugated carbon fiber preform 122 and second corrugated carbon fiber preform 124 in some examples.

Although the method of FIG. 10 and the diagrams of FIG. 11-13 illustrate a first corrugated carbon fiber preform 122 and a second corrugated carbon fiber preform 124, in other examples, more than two (e.g., at least three) corrugated carbon fiber preforms may be substantially aligned (112) and brought into contact (114). For example, a first surface of a first corrugated carbon fiber preform may be substantially aligned with and brought into contact with a first surface of a second corrugated carbon fiber preform. Continuing the example, a second surface of the second corrugated carbon fiber preform may be substantially aligned with and brought into contact with a first surface of a third corrugated carbon fiber preform.

In some examples, the combined thickness of first corrugated carbon fiber preform 122 and second corrugated carbon fiber preform 124 (or the combined thickness of the total number of carbon fiber preforms stacked together) may be between about 12.7 mm (about 0.5 inch) and about 76.2 mm (about 3 inches). In other examples, the thickness the combined thickness of first corrugated carbon fiber preform 122 and second corrugated carbon fiber preform 124 (or the combined thickness of the total number of carbon fiber preforms stacked together) may be between about 12.7 mm (about 0.5 inch) and about 63.5 mm (about 2.5 inches).

Returning now to FIG. 10, once first corrugated carbon fiber preform 122 and second corrugated carbon fiber preform 124 have been brought into contact (114), first corrugated carbon fiber preform 122 and second corrugated carbon fiber preform 124 may be densified to bond first corrugated carbon fiber preform 122 and second corrugated carbon fiber preform 124 (116). Densifying first corrugated carbon fiber preform 122 and second corrugated carbon fiber preform 124 (116) may include at least one densification process and one or more cycles of the densification process. For example, at least one densification process may include VPI, RTM, and/or CVD/CVI. It can be desirable to densify the carbon-carbon composite body in order improve the thermal conductivity of the body; in some cases, as the density of the carbon-carbon composite body increases, it better conducts heat, and the better it acts as a heat sink, which can be a desirable property for carbon-carbon composite bodies used for aircraft brakes.

In some examples of VPI, first corrugated carbon fiber preform 122 and second corrugated carbon fiber preform 124 is heated under inert conditions to well above the melting point of the impregnating pitch. Then, gas in the pores of first corrugated carbon fiber preform 122 and second corrugated carbon fiber preform 124 is removed by evacuating the preforms 122, 124. Finally, molten pitch is allowed to infiltrate the pores of first corrugated carbon fiber preform 122 and second corrugated carbon fiber preform 124, as the overall pressure is returned to one atmosphere or above. In the VPI process, a volume of resin or pitch is melted in one vessel while first corrugated carbon fiber preform 122 and second corrugated carbon fiber preform 124 re contained in a second vessel under vacuum. The molten resin or pitch is transferred from vessel one into first corrugated carbon fiber preform 122 and second corrugated carbon fiber preform 124 contained in the second vessel using a combination of vacuum and pressure. The VPI process may employ resins and pitches which possess low to medium viscosity. Such pitches may provide lower carbon yields than mesophase pitches.

In some examples of RTM, first corrugated carbon fiber preform 122 and second corrugated carbon fiber preform 124 are placed into a mold matching the desired part geometry. Typically, a relatively low viscosity thermoset resin is injected at low temperature (e.g., 50° C. to 150° C.) using pressure or induced under vacuum, into the porous carbon-carbon composite preform contained within a mold. The resin is cured within the mold before being removed from the mold. U.S. Pat. No. 6,537,470 (Wood et al.) describes a more flexible RTM process that can make use of high viscosity resin or pitch. The entire disclosure of U.S. Pat. No. 6,537,470 is incorporated herein by reference.

In some examples of CVD/CVI, first corrugated carbon fiber preform 122 and second corrugated carbon fiber preform 124 are heated in a retort under the cover of inert gas, such as at a pressure below 100 torr. When first corrugated carbon fiber preform 122 and second corrugated carbon fiber preform 124 reach a temperature between about 900° C. and about 1200° C., the inert gas is replaced with a carbon-bearing gas such as natural gas, methane, ethane, propane, butane, propylene, or acetylene, or a combination of at least two of these gases. When the carbon-bearing gas flows around and through first corrugated carbon fiber preform 122 and second corrugated carbon fiber preform 124, a complex set of dehydrogenation, condensation, and polymerization reactions occur, thereby depositing the carbon atoms within the interior and onto the surface of first corrugated carbon fiber preform 122 and second corrugated carbon fiber preform 124. Over time, as more and more of the carbon atoms are deposited onto the surfaces of pores in first corrugated carbon fiber preform 122 and second corrugated carbon fiber preform 124, the preforms 122, 124 becomes more dense. This process is sometimes referred to as densification, because the open spaces in first corrugated carbon fiber preform 122 and second corrugated carbon fiber preform 124 are eventually filled with a carbon matrix until generally solid carbon parts are formed. Depending upon the pressure, temperature, and gas composition, the crystallographic structure and order of the deposited carbon can be controlled, yielding anything from an isotropic carbon to a highly anisotropic, ordered carbon. U.S. Patent Application Publication No. 2006/0046059 (Arico et al.), the entire disclosure of which is incorporated herein by reference, provides an overview of an example of CVD/CVI processing.

In some examples, such as when VPI and/or RTM is used to deposit resin and/or pitch in pores of first corrugated carbon fiber preform 122 and second corrugated carbon fiber preform 124, the resin and/or pitch may be carbonized by heating first corrugated carbon fiber preform 122 and second corrugated carbon fiber preform 124 to a temperature between about 600° C. and about 1200° C. First corrugated carbon fiber preform 122 and second corrugated carbon fiber preform 124 (including the resin and/or pitch) may be heated in a retort under inert or reducing conditions to remove the non-carbon constituents (hydrogen, nitrogen, oxygen, etc.) from the preforms 122, 124. In some examples, carbonization can be carried out either in a furnace, a hot isostatic press, an autoclave, or in a uniaxial hot press. In one example, for instance, the retort may be purged gently with nitrogen for approximately 1 hour, then it is heated to about 900° C. (e.g., at or around 900° C.) in about 10 to about 20 hours, and then to about 1050° C. (e.g., at or around 1050° C.) in about 1 hour to about 2 hours. The retort may be held at about 1050° C. for about 3 to about 6 hours, then allowed to cool overnight.

In some examples, the number and type of densification steps may depend on the process used to form first corrugated carbon fiber preform 122 and second corrugated carbon fiber preform 124. For example, when first corrugated carbon fiber preform 122 and/or second corrugated carbon fiber preform 124 are formed using water as a liquid carrier, at least one VPI and/or at least one RTM densification process may be utilized. As another example, when first corrugated carbon fiber preform 122 and second corrugated carbon fiber preform 124 are formed using molten pitch as a liquid carrier, VPI and/or RTM may not be utilized and densification may be performed using CVD/CVI. Regardless of the method used to form first corrugated carbon fiber preform 122 and second corrugated carbon fiber preform 124, the number and type of densification processes may be selected to provide a predetermined final density to the carbon-carbon composite material. It can be desirable to densify the carbon-carbon composite body in order improve the thermal conductivity of the body; in some cases, as the density of the carbon-carbon composite body increases, the better it conducts heat, and the better it acts as a heat sink. In some examples, the final density may be greater than about 1.5 grams per cubic centimeter ($g/cm^3$), such as between about 1.5 $g/cm^3$ and about 1.9 $g/cm^3$.

After densification, first corrugated carbon fiber preform 122 and second corrugated carbon fiber preform 124 may be referred to as a carbon-carbon composite material. The carbon-carbon composite material may include a plurality of carbon fibers within a substantially continuous (e.g., continuous or nearly continuous) carbon matrix. The substantially continuous carbon matrix may include isotropic and/or anisotropic carbon material formed during the RTM, VPI, and/or CVD/CVI steps and any subsequent carbonization steps.

After densifying first corrugated carbon fiber preform 122 and second corrugated carbon fiber preform 124 (116), the method of FIG. 10 may include machining at least one surface of the densified carbon-carbon composite material (118). The results of one example of the machining step are shown in FIG. 13. FIG. 13 illustrates, in dashed lines, the shape of first corrugated carbon fiber preform 122 and second corrugated carbon fiber preform 124 prior to machining FIG. 13 illustrates in solid lines the shape of carbon-carbon composite material 152. Carbon-carbon composite material 152 defines a first surface 154 and a second surface 156. In the example illustrated in FIG. 13, first surface 154 and second surface 156 are substantially planar (e.g., planar or nearly planar in the x-y plane of FIG. 13) and substantially parallel (e.g., parallel or nearly parallel), although this may not be the case in other examples.

As shown in FIG. 13, first surface 154 was formed by removing ridges 134 of first corrugated carbon fiber preform 122 and second surface 156 was formed by removing ridges 146 of second corrugated carbon fiber preform 124. In some examples, machining at least one surface of the densified carbon-carbon composite material (118) may include machining at least one ridge 134 from second surface 128 of first corrugated carbon fiber preform 122. In some examples, machining at least one surface of the densified carbon-carbon composite material (118) may include machining substantially all (e.g., all or nearly all) ridges 134 from second surface 128 of first corrugated carbon fiber preform 122. Additionally or alternatively, machining at least one surface of the densified carbon-carbon composite material (118) may include machining at least one ridge 146 from second surface 140 of second corrugated carbon fiber preform 124, or machining substantially all (e.g., all or nearly all) ridges 146 from second surface 140 of second corrugated carbon fiber preform 124.

In some examples, machining at least one surface of the densified carbon-carbon carbon composite material (118) may utilize mechanical grinding and/or polishing.

In some examples, the thickness of the carbon-carbon composite material may be between about 12.7 mm (about 0.5 inch) and about 76.2 mm (about 3 inches). In other examples, the thickness of the carbon-carbon composite material may be between about 12.7 mm (about 0.5 inch) and about 63.5 mm (about 2.5 inches).

As shown in FIG. 13, because corrugated carbon fiber preforms 122, 124 include a plurality of carbon fibers that have long axes canted (e.g., angled) out of the x-y plane (e.g., as described with respect to FIG. 5), carbon-carbon composite material 152 may also include a plurality of carbon fibers 158 that have long axes canted (e.g., angled) out of the x-y plane of FIG. 13. For example, long axes of at least some of the plurality of carbon fibers 158 may have component of their orientation in the z-axis direction of FIG. 13. Because carbon-carbon composite material 152 is a layer substantially parallel (e.g., parallel or nearly parallel) to the x-y plane of FIG. 13, the orientation of at least some of the plurality of carbon fibers 158 may be referred to as out of the plane of carbon-carbon composite material 152, or the orientation of at least some of the plurality of carbon fibers 158 may be described as having a component substantially orthogonal to the plane of carbon-carbon composite material 152.

In some examples, the orientation of carbon fibers 158 illustrates in FIG. 13 may provide one or more desirable properties to carbon-carbon composite material 152. For example, carbon-carbon composite material 152 may possess increased structural strength and/or better thermal conductivity in a direction normal to the plane of carbon-carbon composite material 152 due to the inclusion of carbon fibers 158 having a long axis oriented out of the plane of carbon-carbon composite material 152. The increased thermal conductivity and/or structural strength may result in improved friction properties of carbon-carbon composite material 152 compared to a carbon-carbon composite material with a lower number of carbon fibers having a long axis oriented out of the plane of the carbon-carbon composite material.

Various examples have been described. These and other examples are within the scope of the following claims.

What is claimed is:

1. A carbon-carbon composite material comprising:
a first corrugated carbon fiber preform, wherein the first corrugated carbon fiber preform comprises a plurality of carbon fibers and defines a first surface including a first ridge;
a second corrugated carbon fiber preform, wherein the second corrugated carbon fiber preform comprises a plurality of carbon fibers and defines a first surface including a first groove, wherein the first ridge is substantially aligned with the first groove, and wherein the first surface of the first corrugated carbon fiber preform is in contact with the first surface of the second corrugated carbon fiber preform; and
a carbon matrix around the plurality of carbon fibers of the first corrugated carbon fiber preform and the second corrugated carbon fiber preform, wherein the carbon matrix bonds the first corrugated carbon fiber preform and the second carbon fiber preform, wherein each of the carbon fibers of the plurality of carbon fibers defines a respective long axis, wherein the carbon-carbon composite material defines a substantially planar layer, and wherein at least some of the long axes of the carbon fibers of the plurality of carbon fibers are oriented out of the plane of the carbon-carbon composite material.

2. The carbon-carbon composite material of claim 1, wherein the carbon matrix comprises a substantially continuous carbon matrix around the plurality of carbon fibers of the first corrugated carbon fiber preform and the second corrugated carbon fiber preform.

3. The carbon-carbon composite material of claim 1, wherein a second surface of the first corrugated carbon fiber preform opposite from the first surface of the first corrugated carbon fiber preform defines a first surface of the carbon-carbon composite material, and wherein the first surface of the carbon-carbon composite is substantially planar.

4. The carbon-carbon composite material of claim 3, wherein a second surface of the second corrugated carbon fiber preform opposite from the first surface of the second corrugated carbon fiber preform defines a second surface of the carbon-carbon composite material, and wherein the second surface of the carbon-carbon composite is substantially parallel to the first surface of the carbon-carbon composite.

5. A method comprising:
substantially aligning a first ridge on a first surface of a first corrugated carbon fiber preform and a first groove on a first surface of a second corrugated carbon fiber preform, wherein the first corrugated carbon fiber preform comprises a first plurality of carbon fibers, each of the carbon fibers of the first plurality of carbon fibers defining a respective long axis and wherein the second corrugated carbon fiber preform comprises a second plurality of carbon fibers, each of the carbon fibers of the second plurality of carbon fibers defining a respective long axis;
bringing the first surface of the first corrugated carbon fiber preform into contact with the first surface of the second corrugated carbon fiber preform while the first ridge on the first surface of the first corrugated carbon fiber preform is substantially aligned with the first groove on the first surface of the second corrugated carbon fiber preform; and
after bringing the first surface of the first corrugated carbon fiber preform into contact with the first surface of the second corrugated carbon fiber preform, densifying the first corrugated carbon fiber preform and the second carbon fiber preform to form a carbon-carbon composite material including a carbon matrix around the first and second plurality of carbon fibers of the first corrugated carbon fiber preform and the second corrugated carbon fiber preform, respectively, and bond the first corrugated carbon fiber preform and the second carbon fiber preform, wherein the carbon-carbon composite material defines a substantially planar layer, and wherein at least some of the long axes of the carbon fibers of the first plurality of carbon fibers and at least some of the long axes of the carbon fibers of the second plurality of carbon fibers are oriented out of the plane of the carbon-carbon composite material.

6. The method of claim 5, wherein densifying the first corrugated carbon fiber preform and the second carbon fiber preform to bond the first corrugated carbon fiber preform and the second carbon fiber preform comprises vapor phase infiltrating pores of the first corrugated carbon fiber preform and the second carbon fiber preform with molten pitch.

7. The method of claim 5, wherein densifying the first corrugated carbon fiber preform and the second carbon fiber preform to bond the first corrugated carbon fiber preform and the second carbon fiber preform comprises resin transfer molding molten pitch into pores of the first corrugated carbon fiber preform and the second carbon fiber preform.

8. The method of claim 5, wherein densifying the first corrugated carbon fiber preform and the second carbon fiber preform to bond the first corrugated carbon fiber preform and the second carbon fiber preform comprises chemical vapor deposition/chemical vapor infiltration of pores of the first corrugated carbon fiber preform and the second carbon fiber preform with a carbon-bearing gas to deposit carbon atoms in the pores.

9. The method of claim 5, further comprising machining a second surface of the first corrugated carbon fiber preform or a second surface of the second corrugated carbon fiber preform to remove at least one ridge on the second surface of the first corrugated carbon fiber preform or at least one ridge on the second surface of the second corrugated carbon fiber preform to define the substantially planar layer.

10. The method of claim 5, further comprising:
mixing a third plurality of carbon fibers in a liquid carrier to form a carbon fiber mixture;
depositing the carbon fiber mixture in a carbon fiber layer;
forming a plurality of corrugations in the carbon fiber layer to form a corrugated carbon fiber layer; and
rigidifying the corrugated carbon fiber layer to form the first corrugated carbon fiber preform.

11. The method of claim 10, wherein mixing the third plurality of carbon fibers in the liquid carrier to form the carbon fiber mixture comprises mixing the third plurality of carbon fibers in water.

12. The method of claim 11, further comprising removing at least some of the water prior to forming the plurality of corrugations in the carbon fiber layer.

13. The method of claim 11, further comprising aligning the plurality of carbon fibers in the carbon fiber layer prior to forming the plurality of corrugations in the carbon fiber layer.

14. The method of claim 11, wherein rigidifying the corrugated carbon fiber layer to form the corrugated carbon fiber preform comprises removing water from the corrugated carbon fiber layer.

15. The method of claim 10, wherein mixing the third plurality of carbon fibers in the liquid carrier to form the carbon fiber mixture comprises mixing the third plurality of carbon fibers in molten pitch.

16. The method of claim 15, mixing the third plurality of carbon fibers in molten pitch comprises mixing the third plurality of carbon fibers in the molten pitch to a volume fraction of carbon fibers between about 15 volume percent and about 30 volume percent.

17. The method of claim 15, further comprising mixing at least one of titanium, silica, a phosphate, or an oxidizer in the molten pitch.

18. The method of claim 10, wherein forming the plurality of corrugations in the carbon fiber layer to form the corrugated carbon fiber layer comprises at least one of forming a plurality of grooves in the carbon fiber layer using a groover, folding the carbon fiber layer, or crimping the carbon fiber layer.

* * * * *